United States Patent
Ding

(10) Patent No.: US 8,411,584 B1
(45) Date of Patent: Apr. 2, 2013

(54) WIRELESS RESOURCE ALLOCATION SYSTEM AND METHOD

(75) Inventor: Gang Ding, San Diego, CA (US)

(73) Assignee: Olympus Corporation, Tokyo (JP)

( * ) Notice: Subject to any disclaimer, the term of this patent is extended or adjusted under 35 U.S.C. 154(b) by 157 days.

(21) Appl. No.: 12/413,220

(22) Filed: Mar. 27, 2009

Related U.S. Application Data

(60) Provisional application No. 61/041,139, filed on Mar. 31, 2008.

(51) Int. Cl.
*H04L 12/28* (2006.01)
*G06F 15/16* (2006.01)

(52) U.S. Cl. ........ 370/252; 370/254; 370/351; 709/226; 709/229

(58) Field of Classification Search .................. None
See application file for complete search history.

(56) References Cited

U.S. PATENT DOCUMENTS

| | | | |
|---|---|---|---|
| 7,031,266 B1 * | 4/2006 | Patel et al. .................... | 370/254 |
| 7,457,239 B2 * | 11/2008 | Matsubara et al. ........... | 370/230 |
| 7,570,593 B1 * | 8/2009 | ElBatt et al. .................. | 370/238 |
| 7,590,128 B2 * | 9/2009 | Upp et al. ..................... | 370/401 |
| 7,616,575 B2 * | 11/2009 | Padhye et al. ................. | 370/238 |
| 7,765,321 B2 * | 7/2010 | Twata et al. .................. | 709/238 |
| 7,826,463 B2 * | 11/2010 | Patel et al. .................... | 370/401 |
| 7,852,758 B2 * | 12/2010 | Kataoka et al. ............... | 370/230 |
| 7,991,864 B2 * | 8/2011 | Patel et al. .................... | 709/223 |
| 8,036,238 B2 * | 10/2011 | Aoki et al. .................... | 370/412 |
| 2007/0097945 A1 * | 5/2007 | Wang et al. .................... | 370/349 |
| 2007/0280172 A1 * | 12/2007 | Tan et al. ...................... | 370/335 |
| 2009/0040984 A1 * | 2/2009 | Rajamani ...................... | 370/336 |
| 2009/0052319 A1 * | 2/2009 | Muqattash et al. ........ | 370/230.1 |
| 2009/0168800 A1 * | 7/2009 | Leinonen et al. ............. | 370/464 |

* cited by examiner

Primary Examiner — Gregory Sefcheck
(74) Attorney, Agent, or Firm — Sheppard Mullin Richter & Hampton LLP

(57) ABSTRACT

According to various embodiments of the invention, systems and methods for resource allocation and a wireless network provide information to other devices within the network such that a desired precondition may be met and the optimized maximal resource is allocated to the route. In particular embodiments, a network device is configured to append information regarding its available resources for a proposed route to a corresponding routing request. A destination node receiving the routing request provides instructions to the network devices constituting the route according to the earlier appended information.

23 Claims, 7 Drawing Sheets

WIRELESS RESOURCE ALLOCATION SYSTEM AND METHOD

CROSS-REFERENCE TO RELATED APPLICATIONS

This application claims the benefit of U.S. Provisional Application No. 61/041,139 filed Mar. 31, 2008.

TECHNICAL FIELD

The present invention relates generally to communication networks, and more particularly, some embodiments relate to resource allocation in a wireless communications network.

DESCRIPTION OF THE RELATED ART

So-called single-hop networks allow only point-to-point communication between any two neighbors. To enable a single-hop communication, the resource is reserved on both ends of the link. Multi-hopping techniques for wireless networks are sometimes used to extend coverage and usage scenarios for various wireless networks. In a multi-hop communication system, a source node and a destination node are permitted to exchange data indirectly, by transferring it between one or more intermediate relaying nodes. In some cases, multi-hop wireless network protocols have different resources available at each intermediate link, necessitating resource availability tracking for all links. Because the nodes do not transmit and receive at the same time, the intermediate relaying nodes typically provide resources for both transmitting and receiving. Additionally, transmission by one node may affect all its immediate neighbors (1-hop neighbors), as well as its neighbor's neighbors (2-hop neighbors), limiting the available resources of 2-hop neighbors.

Resource reservation generally comprises a generic signaling protocol that combines routing with resource negotiation. When the source node initiates a resource request, it usually requests a certain amount of the resource, which may or may not be available in intermediate links to the destination node. When an intermediate destination node determines that it cannot satisfy the request from the source, it stops the process and sends appropriate feedback to the source.

In a multi-hop distributed network scenario, any intermediate node may trigger a feedback to the source node so that the source has to lower its requested resource and restart the process. This negotiation may continue for multiple rounds before the source, destination, and intermediate nodes reach a final agreement, introducing unwanted communication overhead. Additionally, even if a resource allocation solution is found, the optimal solution may remain unfound. As a result, the allocated resource may be unnecessarily limited and unable to satisfy application requirements.

BRIEF SUMMARY OF EMBODIMENTS OF THE INVENTION

According to various embodiments of the invention, systems and methods for resource allocation in a wireless network provide information to other devices within the network such that a desired precondition may be met. In particular embodiments, a network device is configured to append information regarding its available resources for a proposed route to a corresponding routing request. A destination node receiving the routing request provides instructions to the network devices constituting the route according to the earlier appended information.

According to an embodiment of the invention, a method of data transmission, comprises a process for obtaining a message having a routing request to generate a route comprising links; obtaining information about a local resource available for a route link with a peer device; allocating a portion of the local resource according to the routing request such that interference between the link and a proximate link is below a predetermined level; transmitting or receiving data through the link.

According to a further embodiment of the invention, the step of obtaining the message comprises receiving the routing request from the peer device, the message further comprising information about a peer resource available for the link; and the method further comprises transmitting a routing instruction to the peer device, the routing instruction corresponding to the routing request and comprising an instruction for the peer device to allocate a portion of the peer resource for the link.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

According to various embodiments of the invention, systems and methods for resource allocation in a wireless network provide information to other devices within the network such that a desired precondition may be met. In particular embodiments, a network device is configured to append information regarding its resources available for a proposed route in a corresponding routing request. A destination node receiving the routing request provides instructions to the network devices constituting the route according to the earlier appended information.

Figure 1:
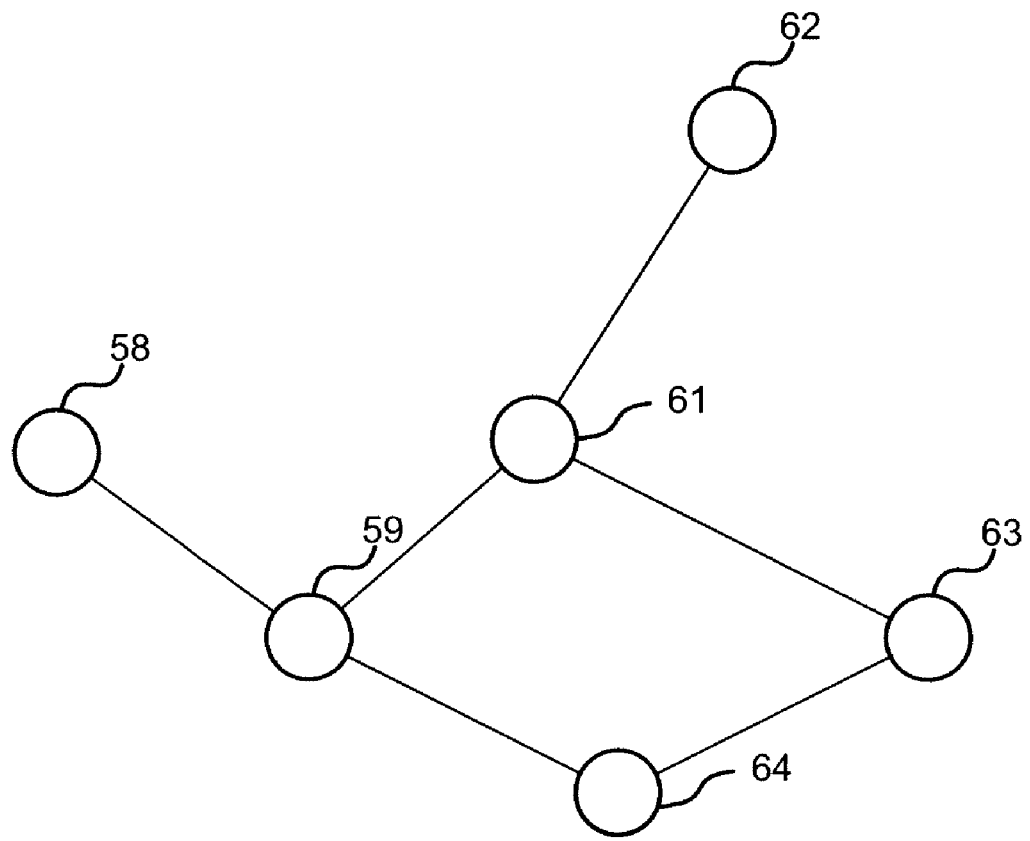
FIG. 1 illustrates an example environment in which an embodiment of the invention may be employed.

Before describing the invention in detail, it is useful to describe a few example environments with which the invention can be implemented. One such example is that of a wireless network, such as a Ultra Wide Band (UWB) wireless network. FIG. 1 illustrates such a UWB wireless network in which embodiments of the invention might be deployed. In such networks some network devices may be deployed outside of the direct connection range of other devices within the network. For example, a network device 58 may be disposed outside the range of network devices 62. Accordingly, any transfer of data between network device 58 and network device 62 must occur through intermediate network devices 59 and 61. In such examples, intermediate network devices 59 and 61 may be configured to allocate resources for the data transmission between devices 58 and 62. The resources may comprise any finite network or device resource used in the transmission of data. For example, in a network employing time division multiple access (TDMA) method, the resource may comprise available time slots of a frequency channel.

In these environments, the available data transmission rate may depend on available resources. For example, device 58 may comprise an HDTV 58 wirelessly connected to a media streaming device 59 that is wirelessly connected to a computer 61, which is in turn wirelessly connected to external hard drive 62. A network user may desire to stream content, such as a high definition television signal, from external hard drive 62 to television 58 at a sufficient data transmission rate to enable delay free viewing. Accordingly, the network may be configured to allocate appropriate resources for this data transmission.

In another example environment, a network may have multiple routes through which data may be transmitted. For example, in the wireless network illustrated in FIG. 1 there may be two possible routes for wireless gaming device 63 to transmit data to television 58. The first route may be represented through as $R_1=(58\text{-}59\text{-}61\text{-}63)$ and the second route may be represented under the same notation as $R_2=(58\text{-}59\text{-}64\text{-}63)$. The data transmission rates available through the two routes may vary depending on the resources available to the devices that make up the routes. Accordingly, the network may be configured such that an appropriate route is chosen for the data transmission.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Figure 2:
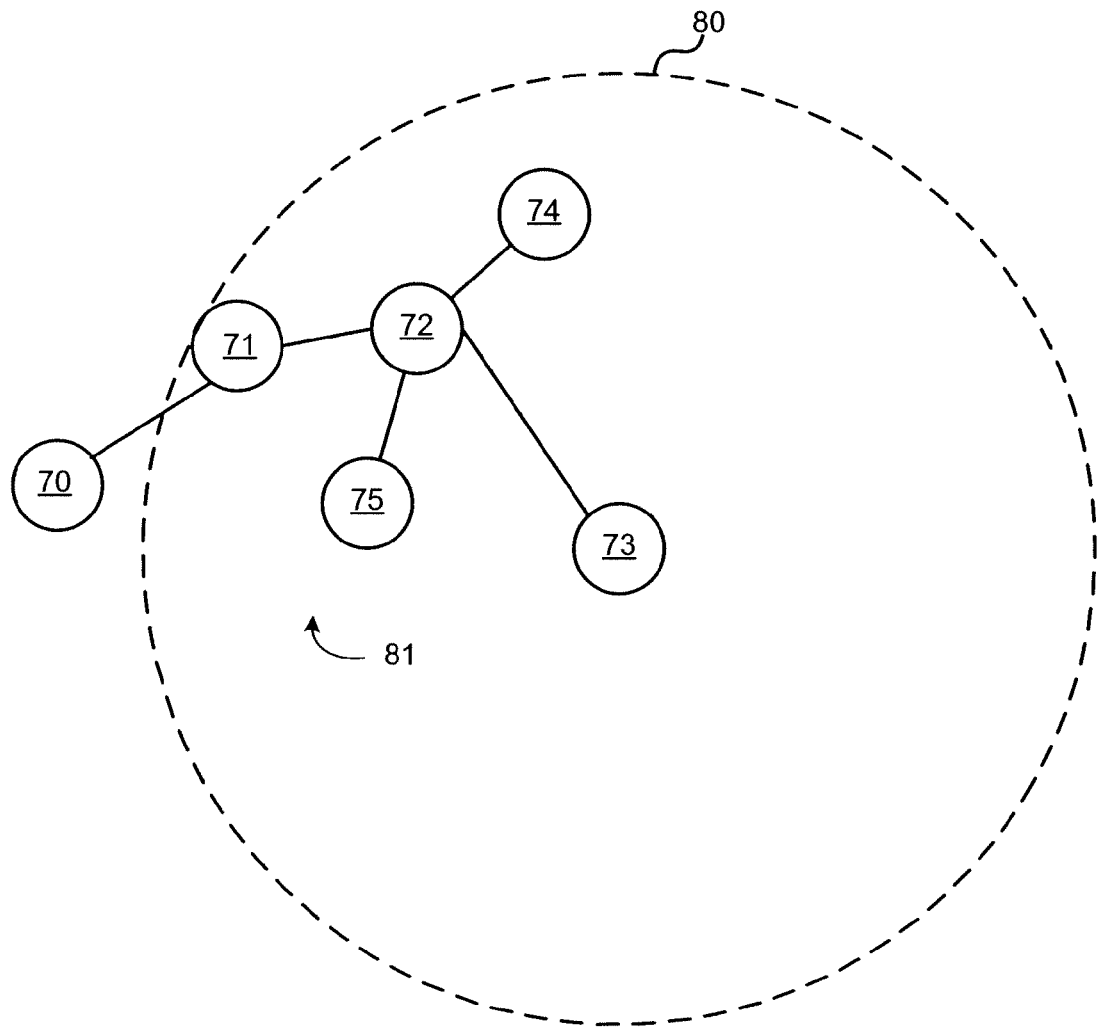
FIG. 2 illustrates example interference conditions that may occur within such a network.

In some embodiments, a wireless network may comprise a plurality of network devices, the devices having single antennas capable of transmitting at half duplex. FIG. 2 illustrates the interference that may occur among the nodes, such as network devices, forming such a wireless network. For example, in an embodiment employing TDMA, data transmission between nodes 70 and 73 via intermediate nodes 71 and 72 may require generating a reserved network route 81=(70-71-72-73) and allocating resources, here time slots, to the route 81. In these embodiments, communication over links between nodes may interfere with communication over other links between further nodes. For example, communication between nodes 70 and 71 via link 1=(70-71) over time slot n affects other nodes' ability to communicate over time slot n. For example, node 72 may not be able to transmit over time slot n without interfering with node 71's or node 70's reception and it may not be able to receive over time slot n because node 70's or node 71's transmission may interfere with its reception. Likewise, node 71 may be within a range 80 such that transmissions by node 73 over time slot n would interfere with node 71's reception. Similar interference with other nodes' operations may occur because of communication over further network links, such as link 71-72, link 72-74, link 72-73, or link 72-75.

In some embodiments, different nodes within a network may have different available resources. For example, in network illustrated in FIG. 2, nodes 72 may form a part of a pre-existing route (75-72-74) that has been allocated time slots $n_1$-$n_3$. Accordingly, time slots $n_1$-$n_3$ are not available for route 81. Similarly, the capabilities or available resources of other nodes may affect the resources available for route 81. Representing each node i's available resources as $C_i$, then the resources available to a link i between node i and j may be represented as $A_i=C_i \cap C_j$. In an embodiment employing frequency division multiple access (FDMA), node i's and j's available resources $C_i$ and $C_j$ may comprise each node's frequency slots that are available for allocation. Accordingly, the available resources for link i $A_i=C_i \cap C_j$ are the available frequency slots shared by nodes i and j.

Figure 3:
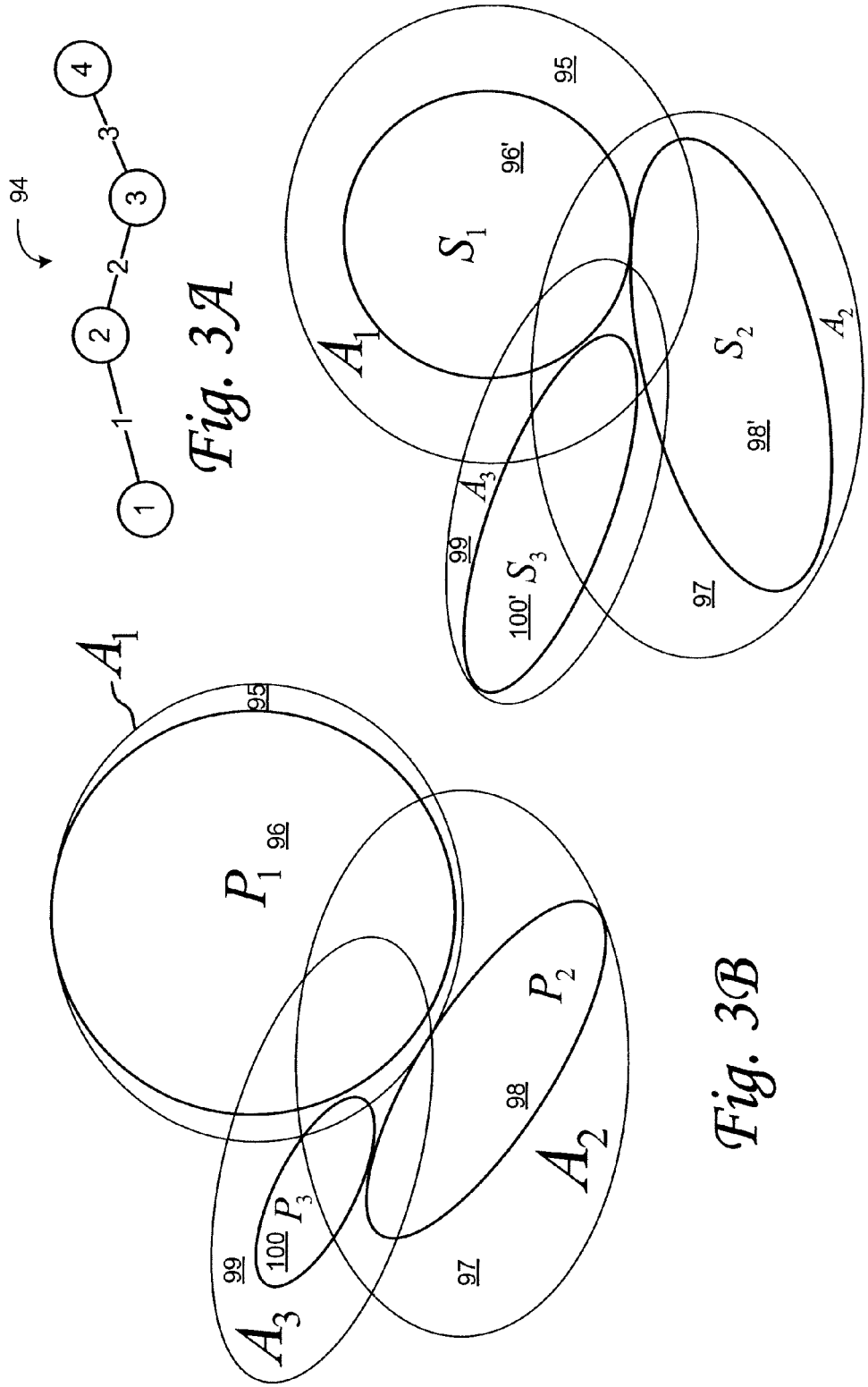
FIG. 3A illustrates an example network according to an embodiment of the invention.
FIG. 3B is a Venn diagram illustrating an example resource allocation scheme for the network illustrated in FIG. 3A.
FIG. 3C is a further Venn diagram illustrating another example resource allocation scheme for the network.

FIG. 3 illustrates an example of a resource allocation among three links according to an embodiment of the invention. FIGS. 3B and 3C are Venn diagrams illustrating two potential resource allocation schemes for the network illustrated in FIG. 3A. In some embodiments, network operations may comprise maximizing or improving data throughput between nodes of a network. For example, in the network illustrated in FIG. 3A, a network operational goal may be maximal data transmission throughput between nodes 1 and 4.

FIG. 3B is a Venn diagram illustrating one such potential allocation of resources. Set $A_1$ 95 represents the available resources that node 1 and node 2 share for link 1. Similarly, areas $A_2$ 97 and $A_3$ 99 represent the available resources for allocation to links 2 and 3 respectively. In this example, the method of resource allocation comprises node 1 instructing node 2 to allocate a portion $P_1$ 196 of the available resources $A_1$ 95 to link 1, such that portion $P_1$ 96 comprises the maximum allocatable resources of $A_1$ 95. Accordingly, node 2's available resources for link 2 $A_2$ 97 have been reduced to $A_2 \backslash P_1$. In this example, node 2 instructs node 3 to allocate portion $P_2$ 98, such that portion $P_2$ 98 comprises the maximum allocatable resources of $A_2 \backslash P_1$. Accordingly, node 3's available resources for link 3 $A_3$ 99 have been reduced to $A_3 \backslash (P_1 \cup P_2)$, so node 3 and node 4 may allocate portion $P_3$ 100 to link 3. In the network illustrated in FIG. 3A, network throughput is dependent on the available input of each link. Accordingly, network throughput is dependent on $\min(P_1, P_2, P_3)=P_3$; if $P_3$ does not comprise sufficient resources for data transmission, then the network must attempt to reallocate resources, for example by repeating the above process with $P_1$ 96 reduced by a predetermined amount.

FIG. 3C is a Venn diagram illustrating a resource allocation scheme according to an embodiment of the invention. In this embodiment, node 1 initiates a routing request for data transmission between nodes 1 and 4 as described with respect to FIG. 3B. Here, data throughput between nodes 1 and 4 may be optimized by maximizing the least disjoint available subset of the available resource sets 99, 95, and 97. In other words, resources may be allocated such that each link's allocated resource set S satisfies $$S_i \subseteq A_i \text{ and } S_i \cap S_j = \emptyset, \text{ where } i,j \in \{1,2,3\} \text{ and } i \neq j \quad (1)$$

and the S with the smallest size is maximized, i.e. through the optimization problem $$\max\left(\min_i \|S_i\|\right) \quad (2)$$

where $\|S_i\|$ is size of the set $S_i$. For example, in embodiments employing TDMA, $\|S_i\|$ represents the number of time slots allocated to link 1.

Figure 4:
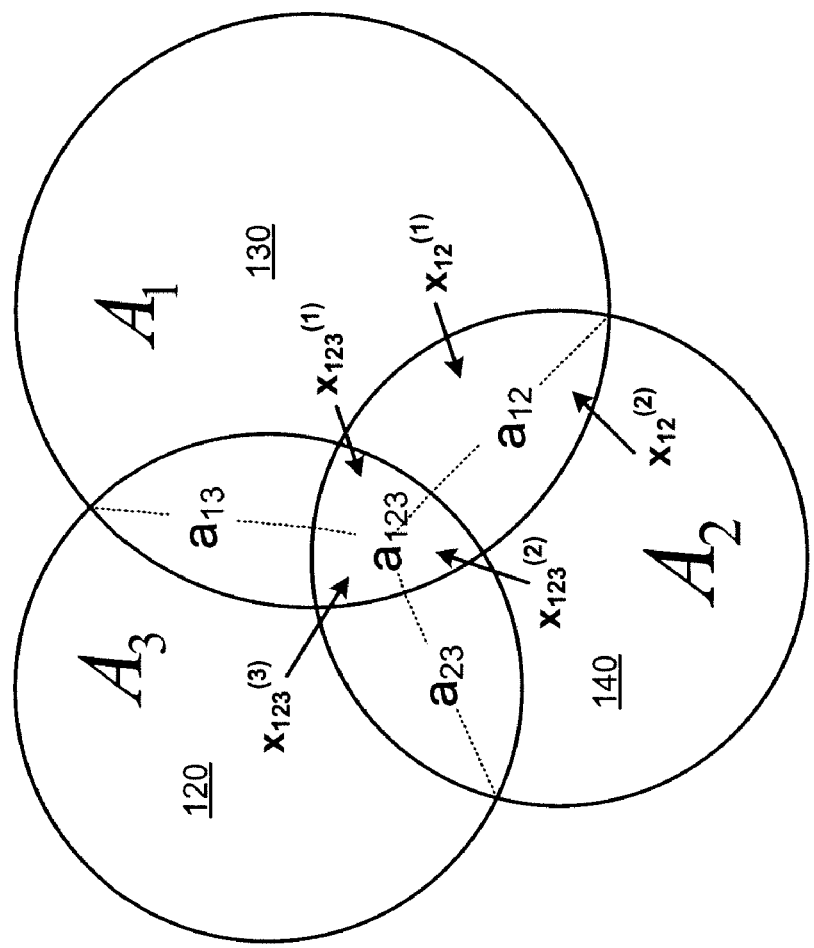
FIG. 4 is a diagram illustrating a resource apportionment scheme according to an embodiment of the invention.

FIG. 4 is a Venn diagram illustrating a resource apportionment scheme according to an embodiment of the invention. Continuing the example network illustrated with respect to FIG. 3, sets $A_1$ 130, $A_2$ 140, and $A_3$ 120 represent the resources available for links 1, 2, and 3, respectively, where links within the network interfere with each other to two hops, for example as described with respect to FIG. 2. For ease of discussion, the following parameters for interfering links are defined as:

$$a_{ij} = \|(A_i \cap A_j) \setminus (UA_m)\| \quad (3)$$

$$x_{ij}^{(k)} = \|(A_i \cap A_j) \setminus (UA_m) \cap S_k\| \quad (4)$$

where m satisfies $|m-i| \geq 2$ and $m \neq i$, or $|m-j| \geq 2$ and $m \neq j$, where the notation $|r-s| \geq t$ indicates that nodes r and s are within t hops of each other. In the these definitions, $a_{ij}$ represents the common available resource of interfering links i and j, but not including other interfering links of i and j (i.e. link i and j's 2-hop neighboring links other than link and j themselves). $x_{ij}^{(k)}$ represents the part of $a_{ij}$ that is included in the selected resource for link k (i.e., the selected resource $S_k$). For example, $a_{12}$ represents the common resource of link 1 and 2, but not link 3, while $x_{12}^{(1)}$ represents the part of $a_{12}$ that is selected by link 1. A selection of such parameters are illustrated in the Venn diagram of FIG. 4. Under these definitions, the resource allocated to each link may be represented $$\|S_i\| = \left\|A_i \setminus \bigcup_{j \neq i} A_j\right\| + \sum_{n \neq p} x_n^j \quad (5)$$

where p and n are arbitrarily defined according to interfering links of the network, under the constraints $$\sum_m x_c^m = a_c \text{ such that } c \in \mathbb{Z}^p \quad (6)$$

where p and m are again arbitrarily defined according to interfering links of the network. For example, in the three link scenario illustrated in FIG. 4, $$\|S1\| = \|A1 \setminus A2 \setminus A3\| + x_{12}^{(1)} + x_{13}^{(1)} + x_{123}^{(1)}$$

$$\|S2\| = \|A2 \setminus A1 \setminus A3\| + x_{12}^{(2)} + x_{23}^{(2)} + x_{123}^{(2)}$$

$$\|S3\| = \|A3 \setminus A1 \setminus A2\| + x_{13}^{(3)} + x_{23}^{(3)} + x_{123}^{(3)}$$

with constraints $$x_{12}^{(1)} + x_{12}^{(2)} = a_{12}$$

$$x_{23}^{(2)} + x_{23}^{(3)} = a_{23}$$

$$x_{13}^{(1)} + x_{13}^{(3)} = a_{13}$$

$$x_{123}^{(1)} + x_{123}^{(2)} + x_{123}^{(3)} = a_{123}$$

Some embodiments of the invention solve, or approximate solutions to, the optimization problem (2), under these constraints. In general networks comprising an arbitrary number of nodes, these example methods may be extended to the general optimization problem of finding the maximum possible resource for the end-to-end route $N_1, N_2, N_3, \ldots, N_{n+1}$, ($n \geq 3$) given with the available resource $C_i$ for each node $N_i$ ($i = 1, 2, \ldots, n+1$). In further embodiments, further network characteristics may be considered when performing these methods. For example, in networks having nodes with different transmit rates, an optimization procedure may further comprise constraining the solution to a preferred transmission rate, for example by preferentially routing data transmission through those devices that have a higher transmission rate. As another example, networks may comprise devices capable of multiple data transmission rates, and these devices may further have different available resources according to a data transmission rate to be used. Accordingly, further embodiments may comprise applying network optimization and routing principles to allocate based on the availability of these multiple rates. Other embodiments may apply these methods to further network types, such as multi-radio or multi-channel networks.

Such resource apportionment may be accomplished through a variety of methods. In one embodiment, one of the nodes of the network 94 may comprise a device that maintains a record of available resources within the network. For example, node 2 may comprise a router, switch, or other network device configured to maintain records of each node's available resources. In such an embodiment, if node 2 receives a routing request sent by node 1 for a route between nodes 1 and 4, then node 2 may solve the optimization problem (2), and to transmit instructions to allocate the appropriate resources determined from the solution to each network node 1, 2, 3, and 4. Accordingly, appropriate resources may be allocated to allow the desired data throughput without a trial-and-error process and without unnecessary resource information communication overhead.

Figure 5:
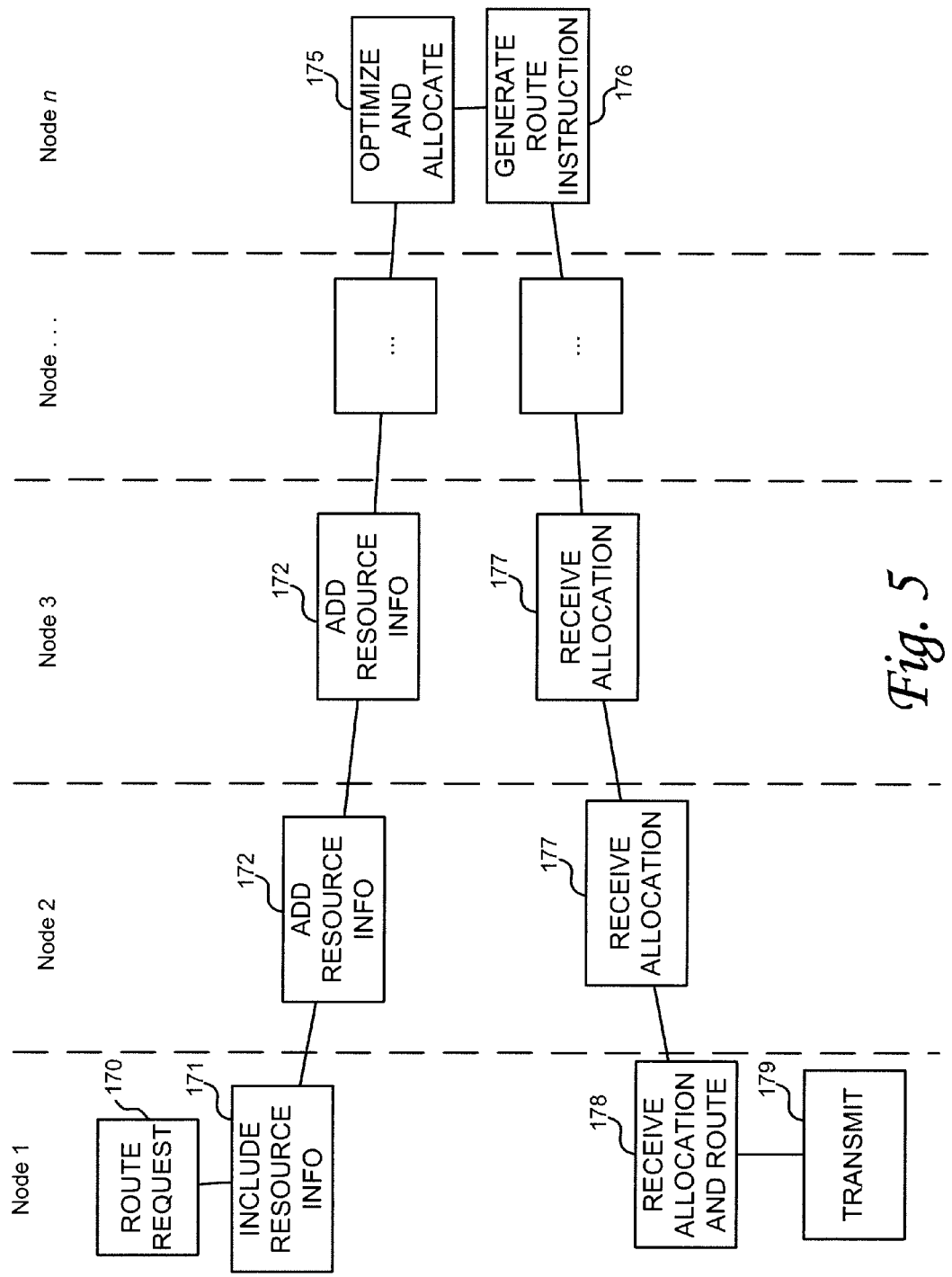
FIG. 5 illustrates a method for data transmission utilizing a network protocol according to an embodiment of the invention.

FIG. 5 illustrates a method for data transmission utilizing a network protocol according to an embodiment of the invention. In the example network illustrated in FIG. 5, node 1 initiates a request 170 for a multi-hop route with node n for data transmission. In this embodiment, node 1 includes information about its available resources 171 with a routing request 170. For example, in a network implementing TDMA, node 1 may include information comprising its available time slots. Under this protocol, intermediate nodes in the multi-hop route, such as node 2 and node 3, append their available resources 172 to the received and forwarded routing request 170.

Accordingly, when the routing request reaches node n, the routing request 170 includes information regarding the available resources of each node in the proposed route. In some embodiments, node n calculates resource allocation for the links comprising the proposed route 175 according to the methods described herein. In this embodiment, after calculation, node n generates a routing instruction 176 comprising instructions for the intermediate nodes to allocate certain resources to the route links. The destination node performing the resource allocation, e.g. node n, may be further configured to instruct the nodes to only allocate resources sufficient to transmit data at the same rate as the link with the least available resources. For example, if link 4 had the least the number of time slots allocatable to the route, at five slots, then the routing instruction 176 may comprise an instruction for each node to allocate only five slots to each link. Accordingly, these excess slots may be utilized as resources for further data transmission between other nodes, as described herein.

Once the routing instruction has been formed, node n transmits the routing instruction 176 back through the network and the intermediate nodes receive their corresponding resource allocation instructions 177, and allocate the appropriate resources for the route. When the source node, node 1, receives the allocation and routing instruction 178, node 1 allocates appropriate resources for its link with node 2 and begins data transmission 179.

Figure 6:
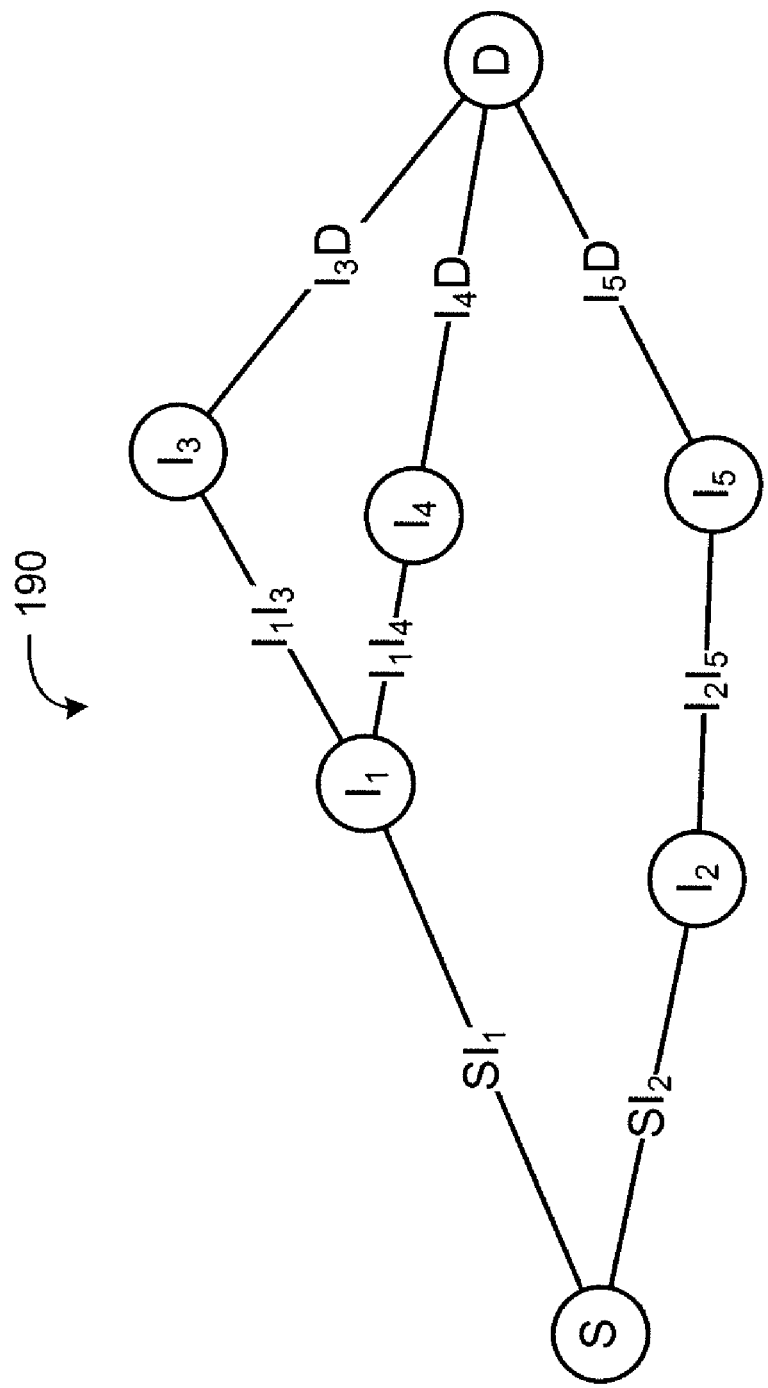
FIG. 6 illustrates a network employing a resource allocation based routing protocol according to an embodiment of the invention.

FIG. 6 illustrates a network employing a resource allocation based routing protocol according to an embodiment of the invention. In the illustrated network 190, node S may desire to transfer data between itself and node D at the fastest possible rate, but along a single route. In network 190 there are three possible routes between node S and node D: $\{(SI_1, I_1I_3, I_3D), (SI_1, I_1I_4, I_4D), (SI_2, I_2I_5, I_5D)\}$. In addition to standard routing requests and procedures, network 190 may be configured such that network devices within the network actively add information regarding their available resources for a proposed route, as described herein. Accordingly, node D may be configured to provide instructions for resource allocation for intermediate nodes between source node S and destination node D, as described herein. Further embodiments may also comprise using the information provided by intermediate nodes in routing decisions. For example, destination node D may choose $(SI_1, I_1I_3, I_3D)$ as the route for data transmission because the intermediate devices of this route meet a predetermined condition for allocatable resources, such as sufficient available time slots or frequency tones to transfer data at a predetermined rate.

Figure 7:
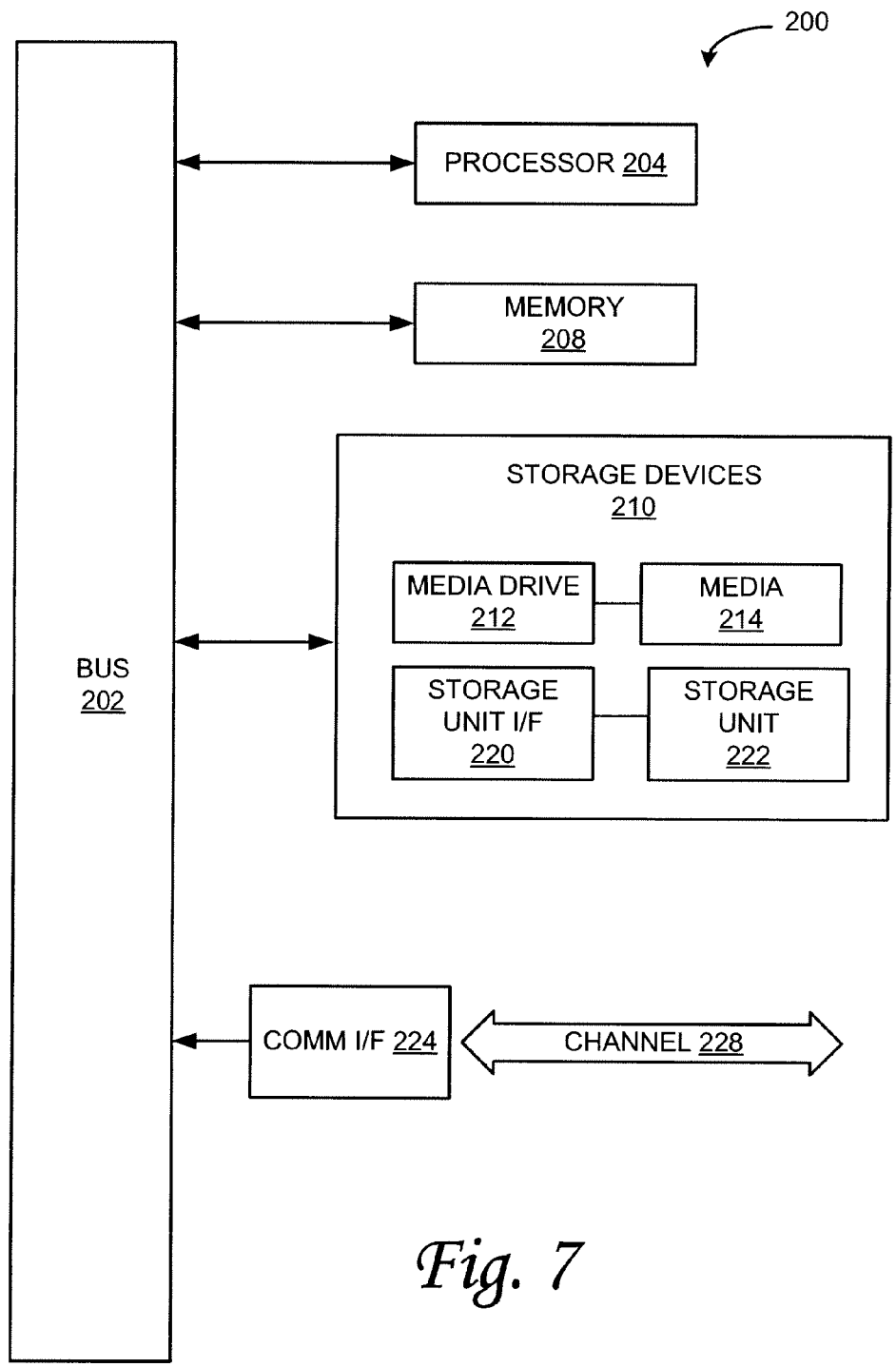
FIG. 7 illustrates a computer module with which various components of embodiments of the invention may be implemented.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example-computing module is shown in FIG. 7. Various embodiments are described in terms of this example-computing module 200. After reading this description, it will become apparent to a person skilled in the relevant art how to implement the invention using other computing modules or architectures.

Referring now to FIG. 7, computing module 200 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 200 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 200 might include, for example, one or more processors, controllers, control modules, or other processing devices, such as a processor 204. Processor 204 might be implemented using a general-purpose or special-purpose processing engine such as, for example, a microprocessor, controller, or other control logic. In the example illustrated in FIG. 7, processor 204 is connected to a bus 202, although any communication medium can be used to facilitate interaction with other components of computing module 200 or to communicate externally.

Computing module 200 might also include one or more memory modules, simply referred to herein as main memory 208. For example, preferably random access memory (RAM) or other dynamic memory, might be used for storing information and instructions to be executed by processor 204. Main memory 208 might also be used for storing temporary variables or other intermediate information during execution of instructions to be executed by processor 204. Computing module 200 might likewise include a read only memory ("ROM") or other static storage device coupled to bus 202 for storing static information and instructions for processor 204.

The computing module 200 might also include one or more various forms of information storage mechanism 210, which might include, for example, a media drive 212 and a storage unit interface 220. The media drive 212 might include a drive or other mechanism to support fixed or removable storage media 214. For example, a hard disk drive, a floppy disk drive, a magnetic tape drive, an optical disk drive, a CD or DVD drive (R or RW), or other removable or fixed media drive might be provided. Accordingly, storage media 214, might include, for example, a hard disk, a floppy disk, magnetic tape, cartridge, optical disk, a CD or DVD, or other fixed or removable medium that is read by, written to or accessed by media drive 212. As these examples illustrate, the storage media 214 can include a computer usable storage medium having stored therein computer software or data.

In alternative embodiments, information storage mechanism 210 might include other similar instrumentalities for allowing computer programs or other instructions or data to be loaded into computing module 200. Such instrumentalities might include, for example, a fixed or removable storage unit 222 and an interface 220. Examples of such storage units 222 and interfaces 220 can include a program cartridge and cartridge interface, a removable memory (for example, a flash memory or other removable memory module) and memory slot, a PCMCIA slot and card, and other fixed or removable storage units 222 and interfaces 220 that allow software and data to be transferred from the storage unit 222 to computing module 200.

Computing module 200 might also include a communications interface 224. Communications interface 224 might be used to allow software and data to be transferred between computing module 200 and external devices. Examples of communications interface 224 might include a modem or softmodem, a network interface (such as an Ethernet, network interface card, UWB, 802.XX or other interface), a communications port (such as for example, a USB port, IR port, RS232 port Bluetooth® interface, or other port), or other communications interface. Software and data transferred via communications interface 224 might typically be carried on signals, which can be electronic, electromagnetic (which includes optical) or other signals capable of being exchanged by a given communications interface 224. These signals might be provided to communications interface 224 via a channel 228. This channel 228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 208, storage unit 220, media 214, and signals on channel 228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 200 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of data transmission, comprising:
a destination peer device obtaining a message from a source peer device via an intermediate peer device, the message comprising a routing request to generate a route between the source peer device and the destination peer device, the route comprising links, wherein the routing request comprises:
  information reflecting local resources of the source peer device included in the message by the source peer device, wherein the local resources of the source peer device are available for a route link with the source peer device; and
  information reflecting local resources of the intermediate peer device added to the message by the intermediate peer device, wherein the local resources of the intermediate peer device are available for a route link with intermediate peer device;
obtaining the information reflecting the source peer device's local resources from the message;
obtaining the information reflecting the intermediate peer device's local resources from the message;

allocating a portion of the intermediate peer device's local resources such that interference between a link including the intermediate peer device and a proximate link to the link including the intermediate peer device is below a predetermined level;

allocating a portion of the source peer device's local resources such that interference between a link including the source peer device and a proximate link to the link including the source peer device is below the predetermined level; and transmitting or receiving data through the link.

2. The method of claim 1, wherein the step of obtaining the message comprises receiving the routing request from the intermediate peer device; and further comprising transmitting a routing instruction to the intermediate peer device, the routing instruction corresponding to the routing request and comprising an instruction for the intermediate peer device to allocate a portion of the peer resource for the link.

3. The method of claim 2, wherein the message further comprises information about further peer resources available for further route links between further intermediate peer devices; and further comprising calculating portions of the further peer resources for the further intermediate peer devices; wherein the routing instruction further comprises instructions for the further intermediate peer devices to allocate the portions for the further route links.

4. The method of claim 3, wherein the resource comprises a time slot.

5. The method of claim 4, wherein the portion of the local available resource and the portion of the peer available resource are disjoint.

6. The method of claim 1, wherein:
the route includes a plurality of peer devices, the plurality of peer devices including a source device and the intermediate device;
the message comprises information specifying an available resource set of each of the plurality of peer devices;
the step of allocating comprises allocating subsets of the available resource sets and allocating a subset of an available resource set of a destination network device such that the allocation of available resources maximizes the smallest subset of the available resource sets.

7. Computer executable program code embodied on a non-transitory computer readable medium configured to cause a destination peer device to perform the functions of:
the destination peer device obtaining a message from a source peer device via an intermediate peer device, the message comprising a routing request to generate a route between the source peer device and the destination peer device, the route comprising links, wherein the routing request comprises:
information reflecting local resources of the source peer device included in the message by the source peer device, wherein the local resources of the source peer device are available for a route link with the source peer device; and
information reflecting local resources of the intermediate peer device added to the message by the intermediate peer device, wherein the local resources of the intermediate peer device are available for a route link with intermediate peer device;
obtaining the information reflecting the source peer device's local resources from the message;
obtaining the information reflecting the intermediate peer device's local resources from the message;
allocating a portion of the intermediate peer device's local resources such that interference between a link including the intermediate peer device and a proximate link to the link including the intermediate peer device is below a predetermined level;
allocating a portion of the source peer device's local resources such that interference between a link including the source peer device and a proximate link to the link including the source peer device is below the predetermined level; and
transmitting or receiving data through the link.

8. The computer executable program code of claim 7, wherein the function of obtaining the message comprises receiving the routing request from the intermediate peer device; and further configured to cause the destination peer device to perform the function of transmitting a routing instruction to the intermediate peer device, the routing instruction corresponding to the routing request and comprising an instruction for the intermediate peer device to allocate a portion of the peer resource for the link.

9. The computer executable program code of claim 8, wherein the message further comprises information about further peer resources available for further route links between further intermediate peer devices; and further comprising calculating portions of the further peer resources for the further intermediate peer devices; wherein the routing instruction further comprises instructions for the further intermediate peer devices to allocate the portions for the further route links.

10. The computer executable program code of claim 9, wherein the resource comprises a time slot.

11. The computer executable program code claim 10, wherein the portion of the local available resource and the portion of the peer available resource are disjoint.

12. A method for network operation, comprising:
a source peer device initiating a routing request to generate a route between the source peer device and a destination peer device, the route comprising links;
wherein the routing request comprises information reflecting resources of the source peer device available for allocation to a link of the route corresponding to the routing request; and
wherein the routing request is configured to be modified by further network devices adding resource information to the routing request, the resource information further resources of the further network devices available for allocation to further links of the route;
transmitting the routing request to a further network device;
receiving a routing instruction corresponding to the routing request, the routing instruction comprising an instruction to allocate a subset of the resources available for allocation to the link; and
establishing a route according to the routing instruction.

13. The method of claim 12, wherein the routing instruction is configured to minimize interference of links of the route caused by other links of the route.

14. The method of claim 13, wherein the routing instruction is further configured to maximize the least amount of resources allocated to a link of the route.

15. The method of claim 14, wherein the network operates using time division multiple access and the resources comprise time slots.

16. The method of claim 15, wherein the network is a wideband wireless network.

17. The method of claim 12, wherein routing instruction comprises an instruction for each network device in the route to allocate a subset of its resources available for allocation, and the instructions maximize the smallest disjoint subset of available resources allocated by any of the network devices in the route.

18. A method for network operation, comprising:
- receiving a routing request to provide a route between a source network device and a destination network device via an intermediate network device,
- wherein the routing request comprises:
  - information included by the source network device available resources of the source network device for links of the route; and
  - information added to the routing request by the intermediate network device reflecting available resources of the intermediate network device for links of the route;
- generating a routing instruction comprising an allocation of a subset of the available resources according to the information received in the routing request; and
- providing the routing instruction to the source network device and the intermediate network device; and
- establishing a route according to the routing instruction.

19. The method of claim 18, wherein the step of generating the routing instruction comprises allocating the available resources such that communications over a link of the route do not interfere with communications over another link of the route.

20. The method of claim 19, wherein the step of generating further comprises maximizing the least amount of resources allocated to the links of the route.

21. The method of claim 20, wherein the network operates using time division multiple access and the resources comprise time slots.

22. The method of claim 21, wherein the network is a wideband wireless network.

23. The method of claim 18, wherein:
- the route includes the source network device, the destination network device, and at least one intermediate device, the intermediate device being one of the at least one intermediate devices;
- when received by the destination network device, the routing request comprises information specifying an available resource set of the source network and information specifying available resource sets of all intermediate network devices in the route;
- wherein, under the allocation of the available resources, each device is allocated a subset of its available resource set, such that the allocated subsets are disjoint, and
- the allocation of available resources maximizes the smallest subset of the available resource sets.

\* \* \* \* \*

UNITED STATES PATENT AND TRADEMARK OFFICE
CERTIFICATE OF CORRECTION

| | | |
|---|---|---|
| PATENT NO. | : 8,411,584 B1 | |
| APPLICATION NO. | : 12/413220 | |
| DATED | : April 2, 2013 | |
| INVENTOR(S) | : Ding | |

It is certified that error appears in the above-identified patent and that said Letters Patent is hereby corrected as shown below:

In the Claim

Claim 18, Column 13, line 9, should read --information included by the source network device reflecting--

Signed and Sealed this
Eighteenth Day of March, 2014

Michelle K. Lee
*Deputy Director of the United States Patent and Trademark Office*